United States Patent
Kim et al.

(10) Patent No.: US 12,223,561 B2
(45) Date of Patent: Feb. 11, 2025

(54) APPARATUS AND METHOD FOR ANALYZING GRAPHICS PROCESSOR PERFORMANCE BASED ON GRAPHICS PROCESSOR ANALYTICAL MODEL

(71) Applicant: University Industry Foundation, Yonsei University, Seoul (KR)

(72) Inventors: Youngsok Kim, Seoul (KR); Jounghoo Lee, Seoul (KR); Yeonan Ha, Seoul (KR); Suhyun Lee, Seoul (KR)

(73) Assignee: UNIVERSITY INDUSTRY FOUNDATION, YONSEI UNIVERSITY, Seoul (KR)

( * ) Notice: Subject to any disclaimer, the term of this patent is extended or adjusted under 35 U.S.C. 154(b) by 196 days.

(21) Appl. No.: 18/086,151

(22) Filed: Dec. 21, 2022

(65) Prior Publication Data
US 2024/0161228 A1 May 16, 2024

(30) Foreign Application Priority Data
Nov. 14, 2022 (KR) .................. 10-2022-0151838

(51) Int. Cl.
G06T 1/60 (2006.01)
G06F 11/34 (2006.01)
G06F 18/23213 (2023.01)
G06T 1/20 (2006.01)

(52) U.S. Cl.
CPC .............. *G06T 1/60* (2013.01); *G06T 1/20* (2013.01); *G06F 11/3447* (2013.01); *G06F 11/3461* (2013.01); *G06F 18/23213* (2023.01)

(58) Field of Classification Search
CPC ......... G06T 1/60; G06T 1/20; G06F 11/3461; G06F 11/3447; G06F 18/23213
See application file for complete search history.

(56) References Cited

U.S. PATENT DOCUMENTS

| | | | |
|---|---|---|---|
| 11,768,715 B1* | 9/2023 | Eltantawy | G06F 9/4881 718/106 |
| 2020/0159586 A1* | 5/2020 | Chandramoorthy | G06F 9/4806 |
| 2021/0266836 A1* | 8/2021 | Samson | H04W 52/18 |

(Continued)

FOREIGN PATENT DOCUMENTS

KR    10-1136850 B1    4/2012

OTHER PUBLICATIONS

Alsop et al—GSI A GPU Stall Inspector to Characterize the Sources of Memory Stalls for Tightly Coupled GPUs—2016—IEEE (Year: 2016).*

*Primary Examiner* — YuJang Tswei
(74) *Attorney, Agent, or Firm* — Paratus Law Group, PLLC

(57) ABSTRACT

There is provided a graphics processor performance analysis apparatus. The apparatus includes a model definition unit that defines a graphics processor core model for identifying structural stalls of computing and a memory, a data stall of the memory, and an idle stall, a simulation execution unit that simulates an operation of a specific GPU by using architecture parameters of a GPU application and the specific GPU as inputs on the basis of the graphics processor core model, and a performance analysis unit that receives an output of the graphics processor core model as a result of the simulation and analyzes performance of the specific GPU.

13 Claims, 11 Drawing Sheets

(56) References Cited

U.S. PATENT DOCUMENTS

| | | | |
|---|---|---|---|
| 2021/0359675 A1* | 11/2021 | Hossain | H03K 17/161 |
| 2023/0109752 A1* | 4/2023 | Levit-Gurevich | G06F 11/3409 717/128 |

* cited by examiner (a) GPUMech and MDM (b) The NVIDIA Turing GPU (a) Greedy-then-oldest scheduling (b) Loose-round-robin scheduling (a) GPUMech and MDM  (b) The NVIDIA Turing GPU (a) 32 lanes & L1 D$ banks  (b) Limited lanes & L1 D$ banks

APPARATUS AND METHOD FOR ANALYZING GRAPHICS PROCESSOR PERFORMANCE BASED ON GRAPHICS PROCESSOR ANALYTICAL MODEL

CROSS-REFERENCE TO PRIOR APPLICATION

This application claims priority to Korean Patent Application No. 10-2022-0151838 (filed on Nov. 14, 2022), which is hereby incorporated by reference in its entirety.

ACKNOWLEDGEMENT

[National Research Development Project supporting the Present Invention]
[Project Serial No.] 1711152718
[Project No.] 2020-0-01361-003
[Department] Ministry of Science and ICT
[Project management (Professional) Institute] Institute of Information & Communications Technology Planning & Evaluation
[Research Project Name] Information & Communication Broadcasting Research Development Project
[Research Task Name] Artificial Intelligence Graduate School Support Project (Yonsei University)
[Contribution Ratio] 1/1
[Project Performing Institute] University Industry Foundation, Yonsei University
[Research Period] 2022.01.01~2022.12.31

BACKGROUND

The present disclosure relates to a graphics processor performance analysis technology, and more particularly, to a performance analysis technology using a new GPU analytical model for accurately capturing a stall event that occurs due to significant change in core microarchitecture of a state-of-the-art GPU to accurately evaluate the performance of the state-of-the-art GPU.

A computer designer can quickly identify and analyze a stall event that degrades the performance of applications and hardware by replacing a long executing cycle level simulator with a performance model. Among various types of performance models, an analytical model can achieve high modeling accuracy and provide deep insight into causes of a stall event. The analytical model cannot only predict the performance, but also form a cycles-per-instruction (CPI) stack. The CPI stack classifies execution latency into various types of stall events, allowing a computer designer to identify a major performance bottleneck phenomenon in the applications and hardware.

A GPU analytical model for capturing unique performance characteristics of the GPU has been proposed in order to enable fast design space exploration of a graphics processing unit (GPU) architecture. For example, GPUMech focuses on capturing a warp-based, highly threaded execution model of the GPU architecture. A multi-warp model can model an off-chip DRAM bandwidth by considering a scheduling policy of a warp scheduler and using a M/D/1 queue. As another example, an MDM may target a memory divergent GPU application that exhibits low spatial locality and causes high memory-side contention.

To achieve a higher computational throughput, a state-of-the-art GPU introduces several improvements to a core microarchitecture. However, enhanced functionality can result in core-side stall events that significantly degrade performance. First, the state-of-the-art GPU core may divide computing resources into sub-cores, and each of the sub-cores may be configured of a set of functional units having a single issue warp scheduler and a limited number of lanes. Limited functional units may cause a compute structural stall because the limited functional units prevent the warp scheduler from issuing one warp instruction per cycle. Second, a per-core L1 data cache (D$) may cause a memory structural stall in that each L1 D$ has limited banks and is shared by sub-cores. The limited L1 D$ bank may make it difficult for a warp to fetch data through a single L1 D$ access, and may cause contention when L1 D$ is shared between the sub-cores.

Third, the state-of-the-art GPU cores may use sectored L1 D$ that divides each cache line into smaller sectors that share the same tag. The sectored L1 D$ may access L2 $ in units of sectors instead of units of cache lines, and greatly affect a data memory stall. Fourth, since the state-of-the-art GPU has a large number of cores and sub-cores per core, load imbalance between cores and between sub-cores of the same core may occur more frequently. An idle stall within and between cores may be caused by load imbalance. To capture such a key core-side stall event and provide accurate insight of the performance, the GPU analytical model needs to faithfully model microarchitectural characteristics of the state-of-the-art GPU core.

Patent Document

Korean Patent No. 10-1136850 (Apr. 9, 2012)

SUMMARY

An embodiment of the present disclosure provides a graphics processor performance analysis apparatus and method based on a graphics processor analytical model that accurately captures stall events that occur due to significant change in core microarchitecture of a state-of-the-art GPU in order to accurately evaluate the performance of the state-of-the-art GPU.

Among embodiments, a graphics processor performance analysis apparatus based on a graphics processor analytical model includes: a model definition unit configured to define a graphics processor core model for identifying structural stalls of computing and a memory, a data stall of the memory, and an idle stall; a simulation execution unit configured to simulate an operation of a specific GPU by using architecture parameters of a GPU application and the specific GPU as inputs on the basis of the graphics processor core model; and a performance analysis unit configured to receive an output of the graphics processor core model as a result of the simulation and analyze performance of the specific GPU.

The graphics processor core model may include a trace collection module configured to collect instruction traces of the GPU application during the simulation; a warp selection module configured to select a representative warp from among a plurality of warps on the basis of a per-warp profile; a cache simulation module configured to perform a cache simulation using the architecture parameters and load/store instructions collected by the trace collection module; an interval profiler configured to divide the execution of the representative warp into a plurality of intervals using an output of the cache simulation; a sub-core model configured to estimate a per-sub-core execution cycle using the plurality of intervals; a first contention model configured to estimate a per-streaming multiprocessor (SM) execution cycle and an intra-SM contention cycle using an output of the sub-core model; a second contention model configured to estimate a memory contention cycle using an output of the first contention model; and a load balance model configured to capture an idle cycle caused by a load imbalance between SMs using an output of the second contention model.

The trace collection module may collect dynamic command traces of the GPU application from an actual GPU or collect related instructions from a functional simulator.

The warp selection module may determine the representative warp by performing k-means clustering on the per-warp profile.

The simulation execution unit may estimate a total cycle of a kernel by averaging execution cycles of respective streaming multiprocessors (SMs) of the specific GPU through the graphics processor core model.

The simulation execution unit may divide and define the execution cycle of the SM as a first active cycle and a first idle cycle.

The simulation execution unit may divide and define a total cycle of a sub-core as a second active cycle and a second idle cycle through a sub-core model of the graphics processor core model, calculate the second idle cycle through a difference between the second active cycles of a specific sub-core and a longest executing sub-core in the same SM, and divide and define the second active cycle as first to third partial active cycles.

The simulation execution unit may apply a condition that all instructions require a single cycle and no hazard occurs, to calculate the first partial active cycle on the basis of the number of cycles required for the sub-core.

The simulation execution unit may model the second and third partial active cycles according to a scheduling policy of a warp scheduler including Greedy-Then-Oldest (GTO) and Loose Round Robin (LRR).

The simulation execution unit may calculate execution cycles of sub-cores through a first contention model of the graphics processor core model, average the execution cycles into a per-sub-core cycle, and sum stall cycles to calculate a first active cycle of the SM.

The simulation execution unit may divide and define the stall cycle as first and second partial stall cycles regarding the structural stalls of the computing and the memory, and third to fifth partial stall cycles according to memory contention.

The simulation execution unit may model the first partial stall cycle using Equation M1 below.

$$S^{ComStruct}(x) = \Sigma_{k \in Intervals}(C_k^{IssueMax}(x) - C_k^{IssueBase}(x))$$ [Equation M1]

(Here, $S^{ComStruct}$ is a first partial stall cycle, x is the number of concurrent execution warps of the sub-core, $C_k^{IssueMax}$ is an issue cycle of a functional unit that takes a longest time in a k-th interval, and $C_k^{IssueBase}$ is a base issue cycle.)

The simulation execution unit may model the second partial stall cycle using Equation M2 below.

$$S^{MemStruct}(x) = \Sigma_{k \in Intervals}(C_{k,L1}^{Issue}(x) - C_k^{IssueBase}(x))$$ [Equation M2]

(Here, $S^{MemStruct}$ is the second partial stall cycle, and $C_{k,L1}^{Issue}$ is an issue cycle for L1 D$ (data cache) at the k-th interval.)

The simulation execution unit may estimate the third to fifth partial stall cycles through a second contention model of the graphics processor core model.

Among the embodiments, a graphics processor performance analysis method based on a graphics processor analytical model includes defining, by a model definition unit, a graphics processor core model for identifying structural stalls of computing and a memory, a data stall of the memory, and an idle stall; simulating, by a simulation execution unit, an operation of a specific GPU by using architecture parameters of a GPU application and the specific GPU as inputs on the basis of the graphics processor core model; and receiving, by a performance analysis unit, an output of the graphics processor core model as a result of the simulation and analyze performance of the specific GPU.

The disclosed technology can have the following effects. However, since this does not mean that a specific embodiment must include all of the following effects or only the following effects, it should not be understood that the scope of rights of the disclosed technology is limited thereby.

With the graphics processor performance analysis apparatus and method based on a graphics processor analytical model according to an embodiment of the present disclosure, it is possible to provide an accurate GPU analytical model for faithfully capturing a stall event on a key core side of a state-of-the-art GPU.

More specifically, with the GCoM that is a GPU analytical model according to the present disclosure, it is possible to identify a computing structural stall event that occurs due to limited per-sub-core functional units, detect a memory structural stall due to sharing characteristics of limited banks and per-core L1 data cache, accurately predict a memory data stall caused by a sectored L1 data cache that divides a cache line into a set of sectors that share the same tag, and capture an idle stall caused due to load imbalance between and within the core.

DETAILED DESCRIPTION

Figure 1:
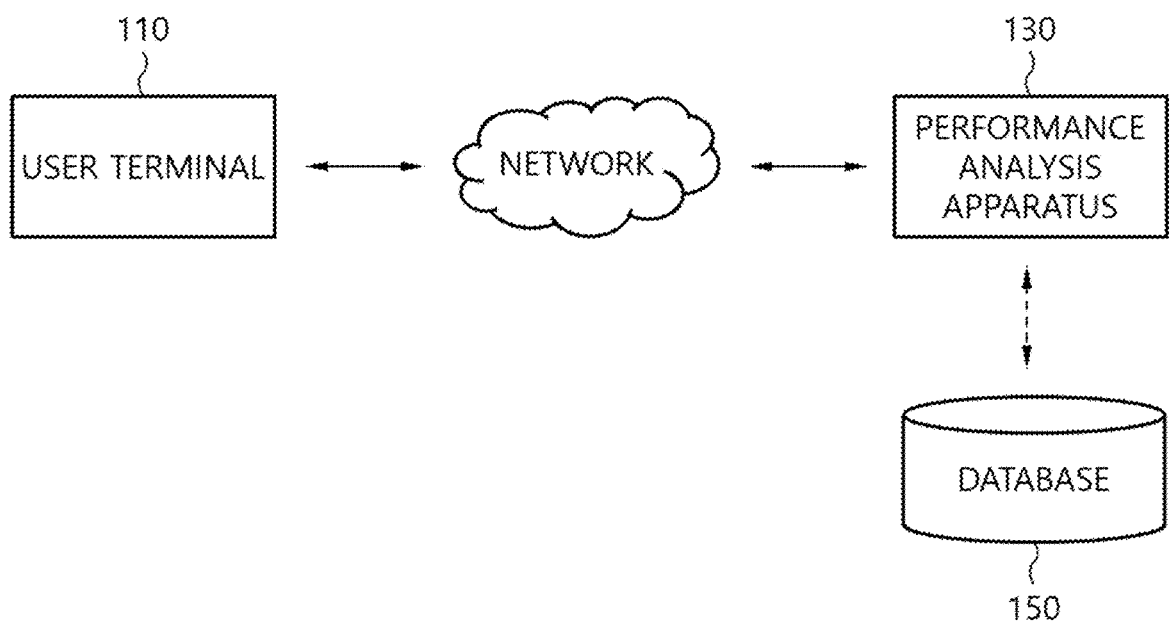
FIG. 1 is a diagram illustrating a performance analysis system according to the present disclosure.

Since the description of the present disclosure is only an embodiment for structural or functional description, the scope of rights of the present disclosure should not be construed as being limited by the embodiments described herein. That is, since the embodiment can be changed in various ways and can have various forms, it should be understood that the scope of rights of the present disclosure includes equivalents capable of realizing the technical idea. Further, since the object or effects presented in the present disclosure does not mean that a specific embodiment should include all of these or only such effects, the scope of rights of the present disclosure should not be construed as being limited thereto.

Meanwhile, the meanings of terms described herein should be understood as follows.

Terms first, second, etc. may be used herein to distinguish one element from another, and the scope of rights should not be limited by these terms. For example, a first element could be termed a second element, and, similarly, a second element could be termed a first element.

It will be understood that, when an element is referred to as being "connected" or "coupled" to another element, it can be directly connected or coupled to the other element or intervening elements may be present. In contrast, it will be understood that, when an element is referred to as being "directly connected" or "directly coupled" to another element, there are no intervening elements present. Meanwhile, other words used to describe a relationship between elements, that is, "between" versus "directly between," "adjacent" versus "directly adjacent," etc. should be interpreted in a like fashion.

It will be understood that the singular forms "a," "an" and "the" include the plural forms as well, unless the context clearly indicates otherwise, and it will be further understood that the terms "comprise," "include", and "have" specify the presence of stated features, integers, steps, operations, elements, components, and/or combinations thereof, but do not preclude the presence or addition of one or more other features, integers, steps, operations, elements, components, and/or combinations thereof.

In respective steps, identification signs (for example, a, b, and c) are used for convenience of description, and the identification signs does not describe an order of the respective steps, and the respective steps may occur in a different order than specified, unless a specific order is clearly described in the context. That is, the respective steps may occur in the same order as specified, may be performed substantially simultaneously, or may be performed in the reverse order.

The present disclosure can be implemented as computer-readable code on a computer-readable recording medium, and the computer-readable recording medium includes all types of recording devices storing data that can be read by a computer system. Examples of the computer-readable recording medium include a ROM, a RAM, a CD-ROM, a magnetic tape, a floppy disk, and an optical data storage device. Further, the computer-readable recording medium may be distributed to computer systems connected through a network and computer-readable codes may be stored and executed in a distributed manner.

All terms used herein have the same meaning as commonly understood by those skilled in the art to which the present disclosure belongs, unless defined otherwise. Terms defined in commonly used dictionaries should be interpreted as consistent with meanings in the context of the related art, and cannot be interpreted as having ideal or excessively formal meanings unless explicitly defined in the present application.

Further, an existing GPU stall classification mechanism can be used herein. Specifically, the following GPU stalls can be utilized to configure a CPI stack.

Base: (Sub)core issues a ready warp

Compute Data (ComData): There is no warp due to unresolved data hazard for an output of a functional unit Compute Structural (ComStruct): A (sub)core cannot issue a ready warp because a target functional unit has not completed execution of previous warp instructions.

Memory Data (MemData): There is no ready warp due to unresolved data hazard for memory access Memory Structural (MemStruct): The (sub) core cannot issue ready warps due to memory-side contention Control/Synchronization (Ctrl): There is no ready warp due to control hazard (for example, synchronization of all TBs)

Idle: There is no warp to be executed in a (sub)core

FIG. 1 is a diagram illustrating a performance analysis system according to the present disclosure.

Referring to FIG. 1, the performance analysis system 100 may include a user terminal 110, a performance analysis apparatus 130, and a database 150.

The user terminal 110 may correspond to a terminal device that is operated by a user. In an embodiment of the present disclosure, a user may be understood as one or more users, and each of the one or more users may correspond to one or more user terminals 110. That is, although one user terminal 110 is shown in FIG. 1, a first user may correspond to a first user terminal, a second user may correspond to a second user terminal, . . . , an n-th user (where n is a natural number) may correspond to an n-th user terminal.

Further, the user terminal 110 may be implemented as one device constituting the performance analysis system 100 according to the present disclosure, and the performance analysis system 100 may be modified and implemented in various forms according to the purpose of graphics processor performance analysis based on a graphics processor analytical model.

Further, the user terminal 110 may be implemented as a smart phone, a laptop computer, or a personal computer that is connected to and operable with the performance analysis apparatus 130, and the user terminal 110 is not necessarily limited thereto and may be implemented with various devices including a tablet PC and the like. In particular, the user terminal 110 may be implemented to include at least one graphics processing unit (GPU).

Meanwhile, the user terminal 110 may be connected to the performance analysis apparatus 130 through a network, and a plurality of user terminals 110 may be simultaneously connected to the performance analysis apparatus 130.

The performance analysis apparatus 130 may be implemented as a server corresponding to a computer or program that performs the graphics processor performance analysis method based on a graphics processor analytical model according to the present disclosure. Further, the performance analysis apparatus 130 may be connected to the user terminal 110 through a wired network or a wireless network such as Bluetooth, WiFi, or LTE, and may transmit or receive data to and from the user terminal 110 through the network. Further, the performance analysis apparatus 130 may be implemented to operate in connection with an independent external system (not illustrated in FIG. 1).

The database 150 may correspond to a storage device that stores various pieces of information necessary for operation processes of the performance analysis apparatus 130. For example, the database 150 may store information on the graphics processor analytical model or store algorithms for GPU simulation and information for performance analysis, but the present disclosure is not limited thereto and the performance analysis apparatus 130 may store information collected or processed in various forms in a graphics processor performance analysis process based on a graphics processor analytical model according to the present disclosure.

Further, the database 150 is shown as a device independent of the performance analysis apparatus 130 in FIG. 1, but is not necessarily limited thereto, and it is obvious that the database 150 may be implemented to be included in the performance analysis apparatus 130 as a logical storage device.

Figure 2:
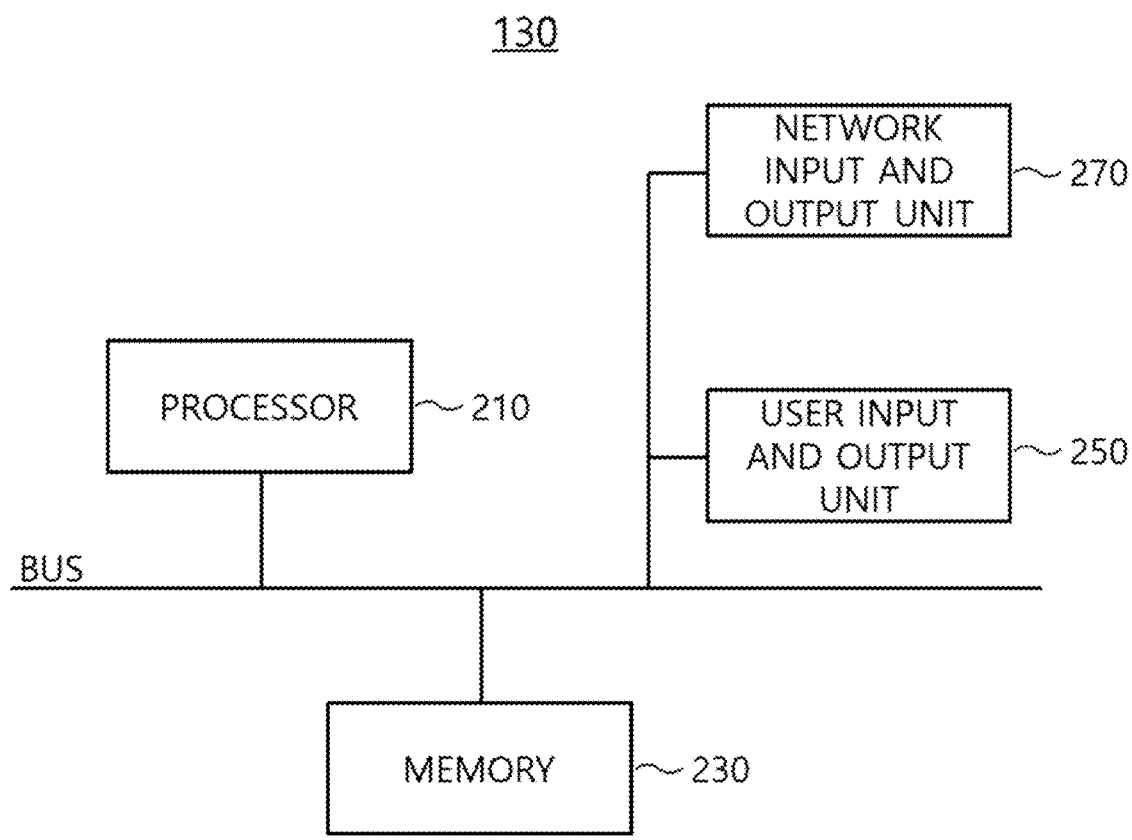
FIG. 2 is a diagram illustrating a system configuration of the performance analysis apparatus of FIG. 1.

FIG. 2 is a diagram illustrating a system configuration of the performance analysis apparatus of FIG. 1.

Referring to FIG. 2, the performance analysis apparatus 130 may include a processor 210, a memory 230, a user input and output unit 250, and a network input and output unit 270.

The processor 210 may execute a graphics processor performance analysis procedure based on a graphics processor analytical model according to an embodiment of the present disclosure, manage the memory 230 that is read or written in such a process, and schedule a synchronization time between a volatile memory and a non-volatile memory in the memory 230. The processor 210 can control an overall operation of the performance analysis apparatus 130, and is electrically connected to the memory 230, the user input and output unit 250, and the network input and output unit 270 to control a data flow between these. The processor 210 may be implemented as a central processing unit (CPU) or a graphics processing unit (GPU) of the performance analysis apparatus 130.

The memory 230 may include a secondary storage device implemented as a non-volatile memory such as a solid state disk (SSD) or a hard disk drive (HDD) and used to store all pieces of data necessary for the performance analysis apparatus 130, and may include a main memory implemented as a volatile memory such as random access memory (RAM). Further, the memory 230 may store a set of instructions that are executed by the electrically connected processor 210 and execute the graphics processor performance analysis method based on a graphics processor analytical model according to the present disclosure.

The user input and output unit 250 may include an environment for receiving a user input and an environment for outputting specific information to the user, and may include, for example, an input device including an adapter such as a touch pad, a touch screen, a screen keyboard, or a pointing device, and an output device including an adapter such as a monitor or a touch screen. In an embodiment, the user input and output unit 250 may correspond to a computing device connected through a remote connection, and in such a case, the performance analysis apparatus 130 may function as an independent server.

Figure 3:
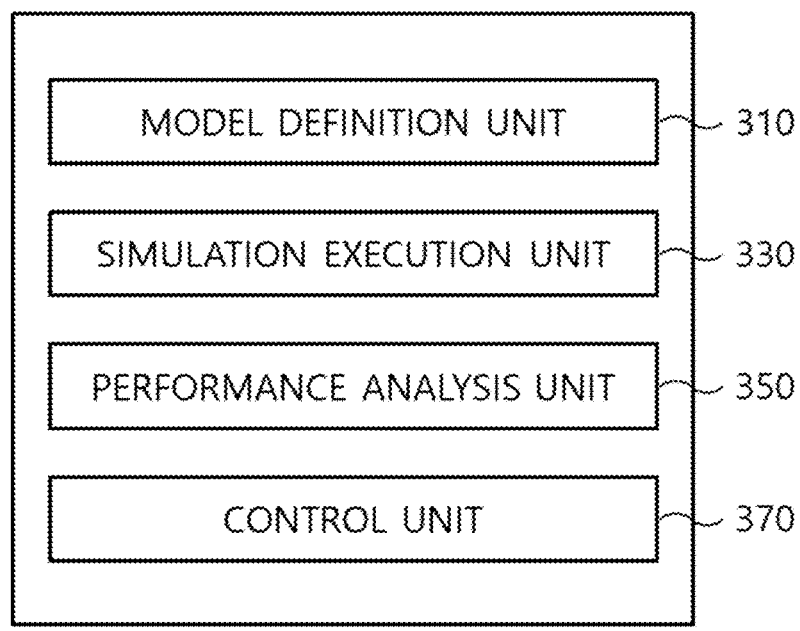
FIG. 3 is a diagram illustrating a functional configuration of the performance analysis apparatus of FIG. 1.

The network input and output unit 270 provides a communication environment for connection to the user terminal 110 through a network, and includes, for example, an adapter for communication such as a local area network (LAN), a metropolitan area network (MAN), a wide area network (WAN), and a value added network (VAN). Further, the network input and output unit 270 may be implemented to provide a short-range communication function such as WiFi or Bluetooth, or a 4G or higher wireless communication function for wireless transmission of data. FIG. 3 is a diagram illustrating a functional configuration of the performance analysis apparatus of FIG. 1.

Referring to FIG. 3, the performance analysis apparatus 130 may include a model definition unit 310, a simulation execution unit 330, a performance analysis unit 350, and a control unit 370.

The model definition unit 310 may define a graphics processor core model for identifying structural stalls of computing and a memory, a data stall of the memory, and an idle stall. Here, a stall may correspond to an event that causes execution latency in an operation process of the GPU, and may be classified into a structural stall, a data stall, idle stall, and the like depending on a position and cause of the occurrence. In this case, the graphics processor core model may correspond to a GPU analytical model capable of accurately capturing a stall event according to a core microarchitecture of the state-of-the-art GPU in order to accurately evaluate the performance of the state-of-the-art GPU.

In an embodiment, the graphics processor core model may include a trace collection module configured to collect instruction traces of the GPU application during the simulation, a warp selection module configured to select a representative warp from among a plurality of warps on the basis of a per-warp profile, a cache simulation module configured to perform a cache simulation using architecture parameters and load/store instructions collected by the trace collection module, an interval profiler configured to divide the execution of the representative warp into a plurality of intervals using an output of the cache simulation, a sub-core model configured to estimate a per-sub-core execution cycle using the plurality of intervals, a first contention model configured to estimate a per-streaming multiprocessor (SM) execution cycle and an intra-SM contention cycle using an output of the sub-core model, a second contention model configured to estimate a memory contention cycle using an output of the first contention model, and a load balance model configured to captures an idle cycle caused by load imbalance between SMs using an output of the second contention model. This will be described in greater detail with reference to FIG. 8.

The simulation execution unit 330 may simulate an operation of the specific GPU by using architecture parameters of a GPU application and the specific GPU as inputs on the basis of the graphics processor core model. That is, the simulation execution unit 330 may simulate an operation of the GPU that processes execution of the GPU application through the graphics processor core model and generate a simulation result. In particular, the simulation execution unit 330 may faithfully capture a stall event on the key core side of the GPU in a simulation process.

In an embodiment, the simulation execution unit 330 may estimate a total cycle of a kernel by averaging execution cycles of respective streaming multiprocessors (SMs) of the specific GPU through the graphics processor core model. The simulation execution unit 330 may determine a cycle stack of the kernel through simulation on the basis of the graphics processor core model. In this case, the total cycle of the kernel may be defined as an average value of execution cycles of SMs, which are streaming multiprocessors constituting the GPU, and may be expressed as in Equation 1 below.

$$C^{Kernel} = \frac{\sum_{i=0}^{\#SMs} C_i}{\#SMs} \quad \text{[Equation 1]}$$

Here, $C^{Kernel}$ is the total cycle of the kernel, $C_i$ is a total cycle of an i-th SM, and #SMs is the number of SMs.

In an embodiment, the simulation execution unit 330 may divide and define an execution cycle of the SM as a first active cycle and a first idle cycle. That is, the simulation execution unit 330 may determine the execution cycle of each SM constituting the GPU as a sum of active cycles and idle cycles in order to capture idle stalls caused by load imbalance between the SMs. In this case, the execution cycle of the i-th SM can be expressed as Equation 2 below.

$$C_i = C_i^{Activ} + C_i^{Idle} \quad [\text{Equation 2}]$$

Here, $C_i^{Active}$ and $C_i^{Idle}$ are an active cycle and an idle cycle of the i-th SM, respectively. That is, the SM may be activated when one or more thread blocks (TBs) are executed. Further, when the activated SM may change into an idle state after completing the execution of the thread block, and may wait until all other activated SMs are brought to the idle state.

In an embodiment, the simulation execution unit 330 may divide and define a total cycle of the sub-core as a second active cycle and a second idle cycle through the sub-core model of the graphics processor core model, calculate the second idle cycle through a difference between the second active cycles of a specific sub-core and a longest executing sub-core in the same SM, and divide and define the second active cycle as first to third partial active cycles. This will be described in greater detail with reference to FIGS. 10 and 11.

In an embodiment, the simulation execution unit 330 may apply a condition that all instructions require a single cycle and no hazard occurs, to calculate the first partial active cycle on the basis of the number of cycles required for the sub-core. That is, the simulation execution unit 330 may determine the first partial active cycle under the assumption that all the instructions require the single cycle and no hazard occurs. In this case, the first partial active cycle may be expressed as Equation 3 below.

$$C_{i,j}^{Base} = \frac{Total\#WarpInsts_{i,j}}{IssueRate} \quad [\text{Equation 3}]$$

$$Total\#WarpInsts_{i,j} = \#Warps_{i,j} \times \#WarpInsts$$

Here, $C_{i,j}^{Base}$ is a first partial active cycle, $\#Warps_{i,j}$ is the number of warps that are executed by a j-th sub-core of the i-th SM, #WarpInsts is the number of representative warp instructions, and Total #WarpInsts$_{i,j}$ is a total number of instructions that are executed by the sub-core.

In an embodiment, the simulation execution unit 330 may model the second and third partial active cycles according to a scheduling policy of a warp scheduler including Greedy-Then-Oldest (GTO) and Loose Round Robin (LRR). That is, the simulation execution unit 330 models stall cycles generated due to data dependency on a long-latency operation as partial active cycles on the basis of interval analysis. This will be described in greater detail with reference to FIG. 11.

In an embodiment, the simulation execution unit 330 may calculate the execution cycles of sub-cores through the first contention model of the graphics processor core model, average the execution cycles into the per-sub-core cycle, and sum stall cycles to calculate the first active cycle of the SM. Here, the first contention model may correspond to an intra-SM contention model constituting the graphics processor core model. The intra-SM contention model may aim to accurately capture a MemStruct stall due to limited L1 D$ banks. The sub-core model may be assumed to operate independently because each sub-core has sufficient resources for execution, and does not consider contention within the SM, and the simulation execution unit 330 may apply the intra-SM contention model to the sub-core model to capture.

Further, the first contention model may calculate the first active cycle using Equation 4 below.

$$C_i^{Active} = \frac{\sum_{j=0}^{\#SubCoresSM-1} C_{i,j}}{\#SubCoresSM} + S_i \quad [\text{Equation 4}]$$

Here, $S_i$ is the stall cycle of the i-th SM, and #SubCoresSM is the number of sub cores per SM.

In an embodiment, the simulation execution unit 330 may divide and define the stall cycle as first and second partial stall cycles regarding the structural stalls of the computing and the memory, and third to fifth partial stall cycles according to memory contention. This will be described in greater detail with reference to FIGS. 12 and 13.

In an embodiment, the simulation execution unit 330 may model the first partial stall cycle using Equation M1 below. This will be described in greater detail with reference to FIGS. 12 and 13.

$$S^{ComStruct}(x) = \Sigma_{k \in Intervals}(C_k^{IssueMax}(x) - C_k^{IssueBase}(x)) \quad [\text{Equation M1}]$$

Here, $S^{ComStruct}$ is the first partial stall cycle, x is the number of concurrent execution warps of the sub-core, $C_k^{IssueMax}$ is an issue cycle of the functional unit that takes the longest time in the k-th interval, and $C_k^{IssueBase}$ is a base issue cycle.

In an embodiment, the simulation execution unit 330 may model the second partial stall cycle using Equation M2 below. This will be described in greater detail with reference to FIGS. 12 and 13.

$$S^{MemStruct}(x) = \Sigma_{k \in Intervals}(C_{k,L1}^{Issue}(x) - C_k^{IssueBase}(x)) \quad [\text{Equation M2}]$$

Here, $S^{MemStruct}$ is the second partial stall cycle, and $C_{k,L1}^{Issue}$ is an issue cycle for L1 D$ (data cache) at the k-th interval.

In an embodiment, the simulation execution unit 330 may estimate third to fifth partial stall cycles through the second contention model of the graphics processor core model. This will be described in greater detail with reference to FIGS. 12 and 13.

The performance analysis unit 350 may analyze the performance of the specific GPU by receiving the output of the graphics processor core model as a simulation result. That is, the performance analysis unit 350 may perform GPU performance analysis more accurately through the graphics processor core model defined to faithfully capture a key core-side stall of the state-of-the-art GPU.

The control unit 370 may control an overall operation of the performance analysis apparatus 130 and manage a control flow or data flow between the model definition unit 310, the simulation execution unit 330, and the performance analysis unit 350.

Figure 4:
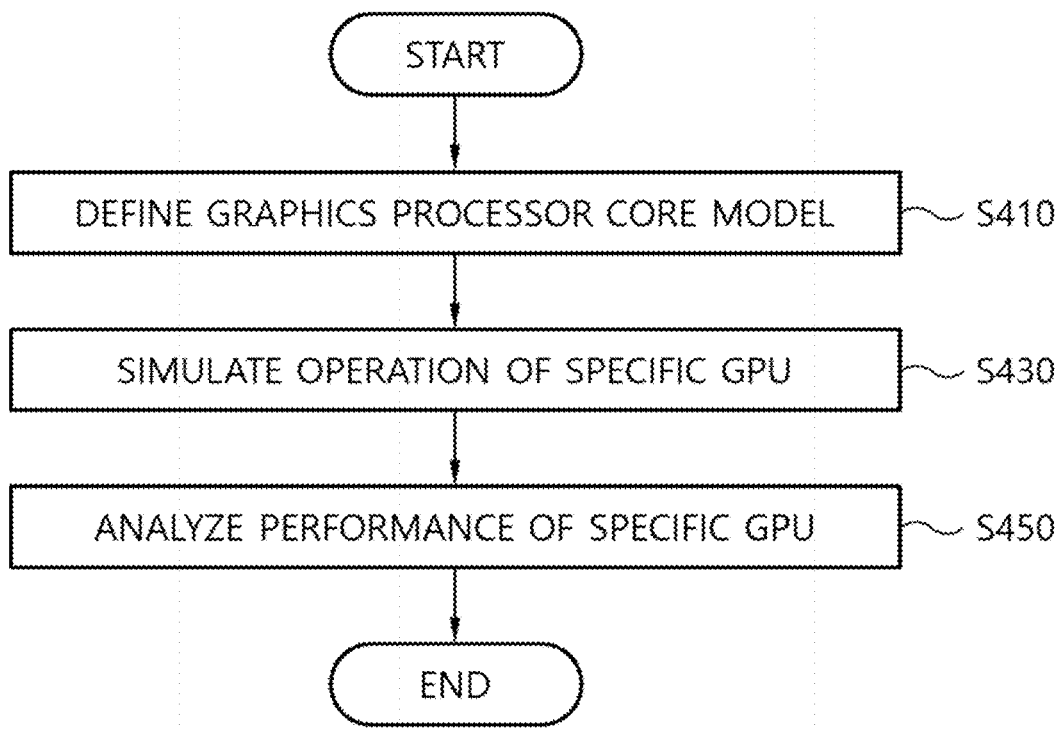
FIG. 4 is a flowchart illustrating a graphics processor performance analysis method based on a graphics processor analytical model according to the present disclosure.

FIG. 4 is a flowchart illustrating the graphics processor performance analysis method based on a graphics processor analytical model according to the present disclosure.

Referring to FIG. 4, the performance analysis apparatus 130 may perform the graphics processor performance analysis method based on a graphics processor analytical model according to the present disclosure. More specifically, the performance analysis apparatus 130 may define a graphics processor core model for identifying the structural stalls of the computing and the memory, the data stall of the memory, and the idle stall through the model definition unit 310 (step S410).

Further, the performance analysis apparatus 130 may simulate the operation of the specific GPU by using the architecture parameters of the GPU application and the specific GPU as inputs on the basis of the graphics processor core model through the simulation execution unit 330 (step S430). The performance analysis apparatus 130 may analyze the performance of the specific GPU by receiving the output of the graphics processor core model as a simulation result through the performance analysis unit 350 (step S450).

Figure 5:
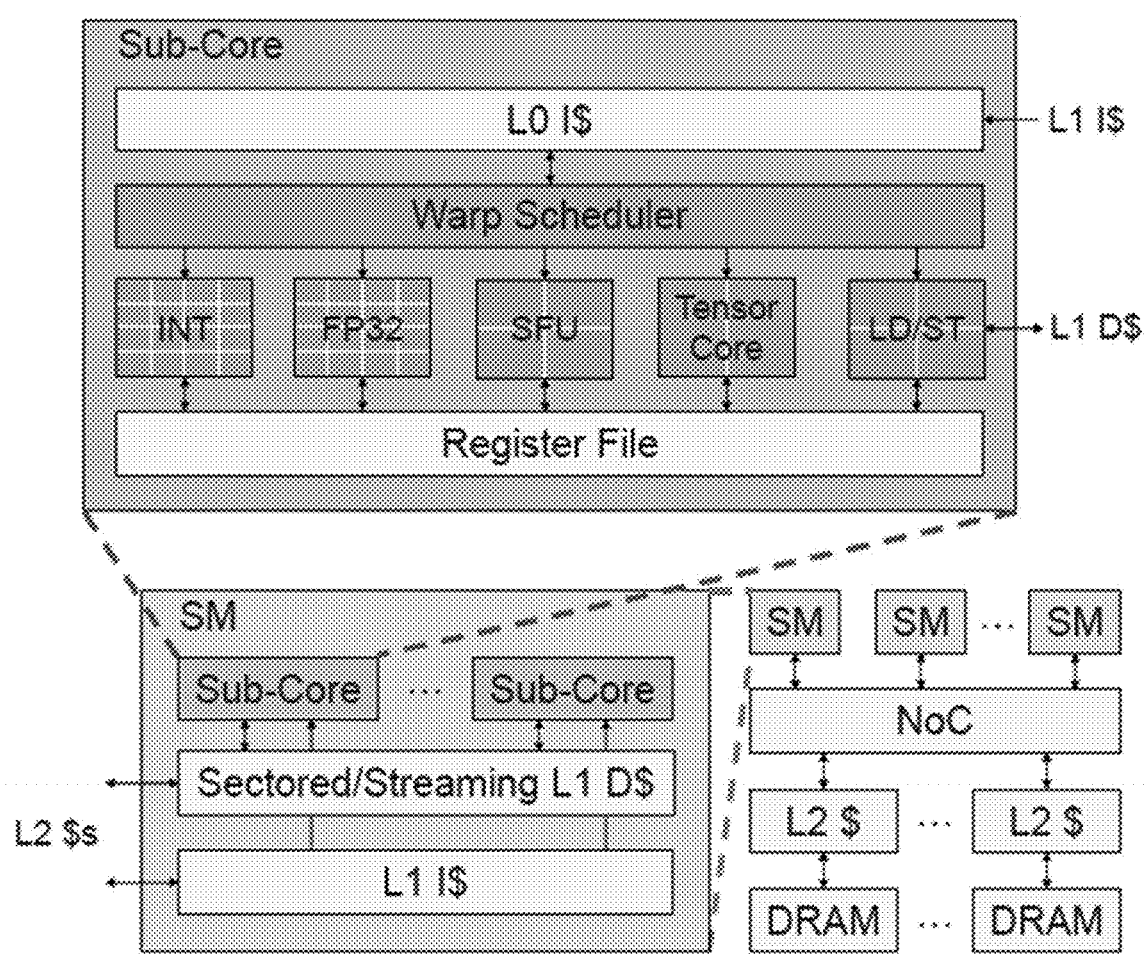
FIG. 5 is a diagram illustrating a microarchitecture of a state-of-the-art GPU.

FIG. 5 is a diagram illustrating a microarchitecture of the state-of-the-art GPU.

Referring to FIG. 5, a graphics processing unit (GPU) may use a highly multi-threaded execution model capable of concurrently executing up to tens of thousands of threads at a time. In FIG. 5, a microarchitecture of NVIDIA Turing GPU, which is the state-of-the-art GPU architecture introduced in 2018, is illustrated. The GPU may be configured of multiple streaming multiple processors (SMs), an interconnection network (NoC), and multiple memory channels. The SM may be divided into several sub-cores, and each of the sub-cores may be configured of a warp scheduler, a functional unit capable of executing various types of operations, a load/store (LD/ST) unit, and a register file and L0 instruction cache (I$).

Further, the SM may include a write-no-allocate L1 data cache (D$), and L1 I$. L1 D$ is lockup-free (streaming), and may be sectored. That is, a 128-byte cache line may be divided into four 32-byte sectors that share the same tag. The load/store unit of each sub-core may load/store data for the memory channel by interacting with L1 D$. Each of the memory channels may include a write-back L2 cache partition, and an off-chip DRAM partition. The GPU may interleave physical memory spaces in all the memory channels in 256-byte fine units. The NoC can connect SM to the memory channels.

An application may execute each operation on the GPU by calling a kernel written by a GPU programming API (for example, CUDA or OpenCL). The kernel can group threads into thread blocks (TB). The threads within the same TB can synchronize a progress situation and share data through a shared memory. When an application calls the kernel, the GPU can allocate the TBs to the SM having sufficient available resources (for example, registers). Then, the SM may divide the TB into warps (32 threads per warp in the case of NVIDIA GPU) and distribute the warps to the sub-cores.

In this case, the threads of the same warp may be executed in a lock-step manner. When the thread encounters a branch, the execution of the thread along one path may be time-interleaved with the execution of other threads. Then, the warp scheduler of each sub-core may issue one of the allocated warps to the functional unit and the LD/ST unit, and a maximum throughput may correspond to one warp instruction per clock. Since each warp scheduler can issue at most one warp instruction per cycle, the maximum number of warp instructions that the SM can execute per cycle may be equal to the number of warp schedulers in the SM.

Figure 6:
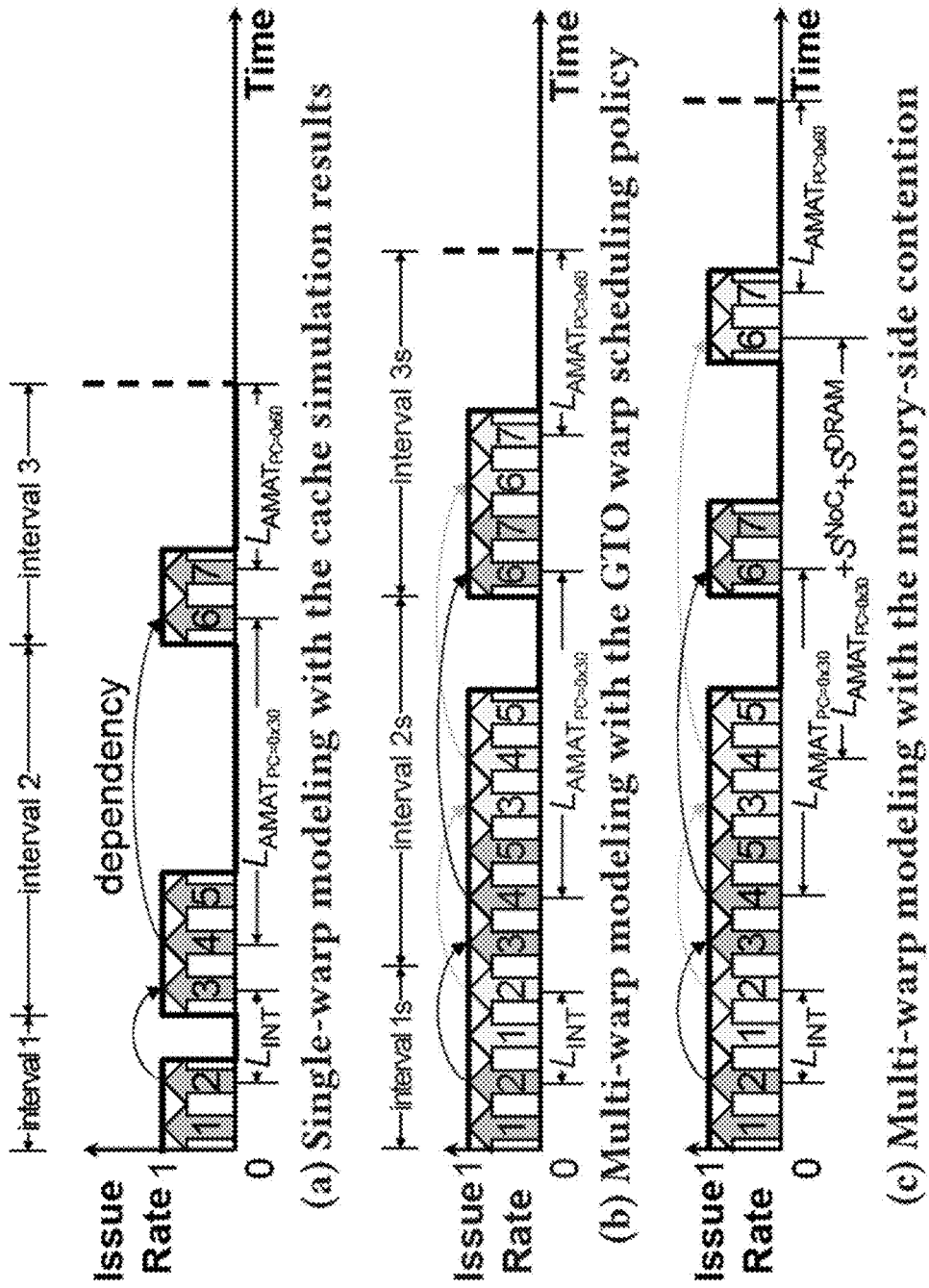
FIG. 6 is a diagram illustrating interval analysis-based GPU analytical modeling.

FIG. 6 is a diagram illustrating interval analysis-based GPU analytical modeling.

Referring to FIG. 6, an interval analysis-based GPU analytical model may correspond to one of approaches to accurately modeling CPU performance. A key idea for modeling the performance using interval analysis may be that the warp scheduler maintains a maximum issuance rate when no stall events occur. Ideally, the warp scheduler needs to maintain a throughput of one warp instruction per cycle throughout kernel execution.

However, the warp scheduler may stall when any of the following stall events occur. That is, (a) there is no warp assigned to the warp scheduler (for example, the warp scheduler has executed all the assigned warps), (b) Warps are not ready due to unresolved data/control dependency and/or a barrier in units of TBs; and (c) warps are ready but the functional unit or the LD/ST unit that is a target has not executed previous warp instructions. Since there are various stall events that hinder the GPU achieving peak performance, the GPU analytical model needs to accurately capture a stall event and estimate an influence on the performance.

a cache simulator, a single-warp model, a multi-warp model, and a memory-side contention model may be used as existing GPU analytical models to accurately capture a warp-based execution model of the GPU.

In FIG. 6, a method in which existing models estimate performance in a bottom-up manner is illustrated. First, the existing models may select representative warps using functional unit latencies and average memory access time (AMAT) of load and store instructions estimated by the cache simulator, and form an execution timeline. In this case, warps of the kernel may exhibit similar execution operations, and high modeling accuracy may be achieved when the performance is estimated by abstracting the warps into representative warps. The cache simulator can use, as inputs, memory instructions of each warp in a round robin manner.

Second, the existing models can divide an execution timeline of the representative warp into intervals using a single warp model ((a) of FIG. 6). Each interval may consist of a series of instructions that have achieved a maximum issuance rate (for example, one warp instruction per cycle) followed by stall cycles caused by various stall events. Third, the existing models may use a multi-warp model for applying a warp scheduling policy such as greedy-the-oldest (GTO) to derive an execution timeline per SM, and assump that the SM gets populated with the representative warp ((b) of FIG. 6).

Thereafter, the existing models may consider memory-side contention caused by a limited number of miss-status holding registers (MSHR) and/or NoC, and DRAM congestion ((c) of FIG. 6). For example, the MDM may focus on batching of memory requests due to MSHR contention. The MDM may calculate an L1 D$ cache read failure during execution of concurrently issued intervals (for example, interval 2s in (b) of FIG. 6). The number of batches may correspond to a quotient of the request count and the MSHR size under the assumption that these read requests are transmitted to the NoC in batches until the MSHR is full.

Thus, an amount of MSHR contention may correspond to a service time of all batches including a NoC/DRAM queuing delay. When it is assumed that all SMs send the same batch of a read request and a write request, the NoC and DRAM queuing delay of batches can be evaluated. The MDM can estimate the queuing delay using loading of concurrent memory requests, an average L2 cache miss rate, and a maximum bandwidth of a NoC/DRAM. Finally, the existing models can predict the performance of the GPU using a derived multi-warp execution timeline.

Figure 7:
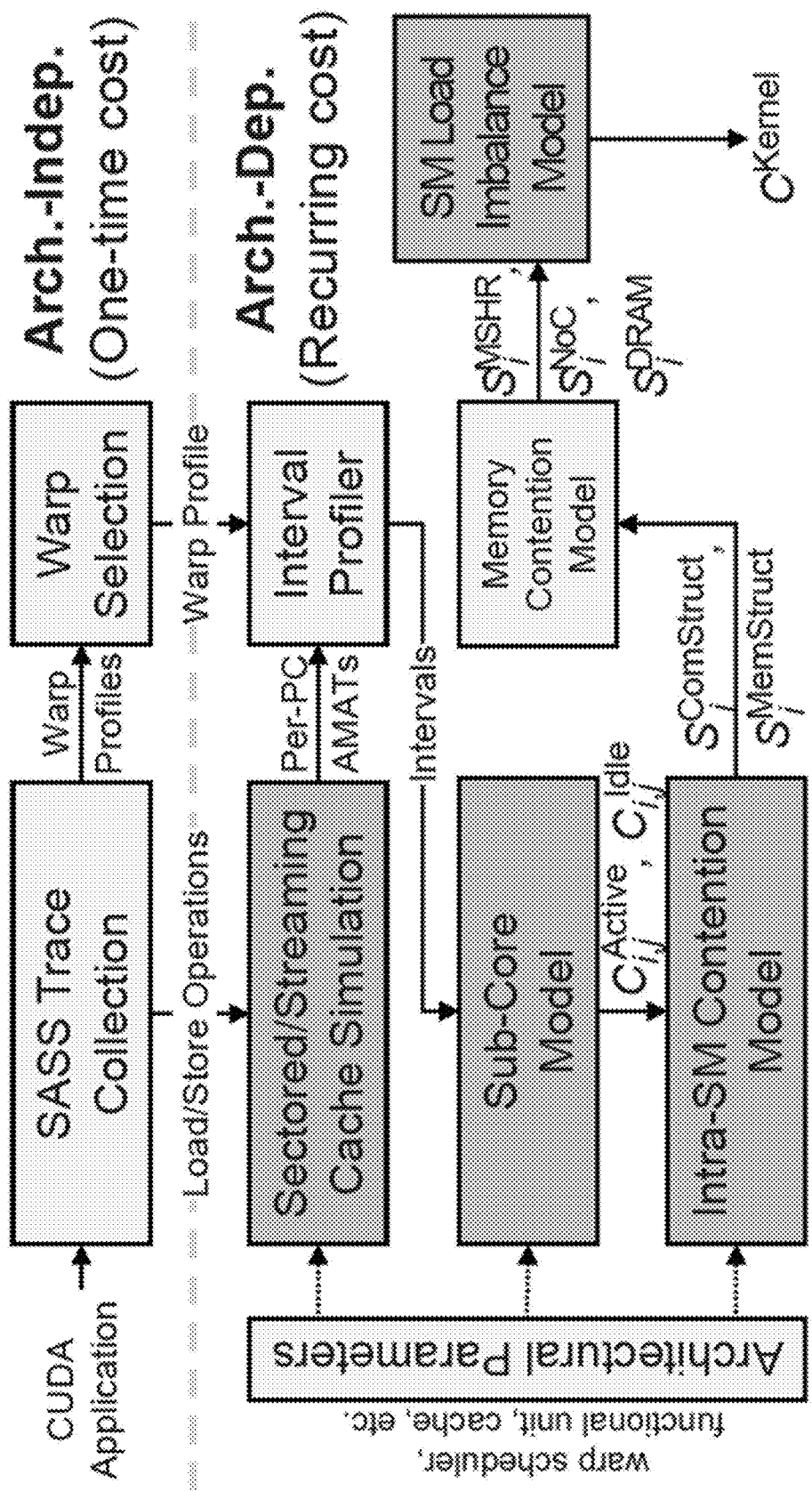
FIG. 7 is a diagram illustrating an overall architecture of a graphics processor core model according to the present disclosure.

FIG. 7 is a diagram illustrating an overall architecture of the graphics processor core model according to the present disclosure.

Referring to FIG. 7, a detailed GPU core model (GCOM) corresponding to a graphics processor core model according to the present disclosure may use the architecture parameters of the GPU application and a target GPU as inputs. Then, the GCoM can collect dynamic SASS instruction traces of the application through instrumentation on an actual GPU using a dynamic binary instrumentation framework for NVIDIA GPUs (NVBit) through a SASS trace collection model. Since collecting on the actual GPU is much faster than collecting intermediate PTX instructions in a functional simulator, the GCoM can focus on dynamic traces.

Here, NVBit may correspond to a prototype binary instrumentation framework for CUDA. Further, PTX may correspond to a set of instructions for CUDA parallel programming, and is implemented in the same structure as that of an assembly language so that each instruction may consist of an operation to be performed and a target of the operation to be performed.

Further, SASS traces can enable GCoM to achieve higher modeling accuracy than using PTX instructions. It is obvious that GCoM can be configured using the PTX commands instead, as necessary. Further, the GCoM can utilize accurate memory contention modeling of the MDM by using the MDM as a memory contention model.

After the SASS traces are collected, the GCoM can select a representative warp of the kernel on the basis of a per-warp profile through a Warp Selection module. That is, the GCoM can use the representative warp to approximate operation of other warps. In this case, a warp profile may reflect architecture-independent characteristics (for example, the number of dynamic instructions, and a distribution of instruction types) of the warp. The GCoM can perform k-means clustering on warp profiles similar to GPUMech to select the representative warp.

Then, the GCoM can perform cache simulation using load/store instructions collected through the cache simulation module (sectored/streaming cache simulation) and the provided architecture parameters. An interval profiling step may correspond to a step of dividing the execution of the representative warp into intervals using cache simulation outputs (for example, load/store-specific instruction AMAT) through an interval profiler. The intervals, the cache simulation outputs, and the architecture parameters can be used in main components (that is, the sub-core model, the intra-SM contention model, and an SM load imbalance model) of the GCoM.

First, a sub-core model may estimate a per-sub-core execution cycle using an interval. Then, the intra-SM contention model can predict a per-SM execution cycle and an intra-SM contention cycle. Then, the GCoM can calculate the memory contention cycle using the MDM. Finally, the SM load imbalance model of the GCoM can capture idle cycles caused by load imbalance between the SMs.

Trace collection and representative warp selection steps of the GCoM may cause a one-time cost for each application. Other components of the GCoM may cause a recurring cost proportional to the number of evaluated design points. That is, the GCoM may cause a lower recurring cost despite a larger one-time cost than other existing models (for example, Accel-Sim cycle-level simulator) and perform much faster design space exploration.

Figure 8:
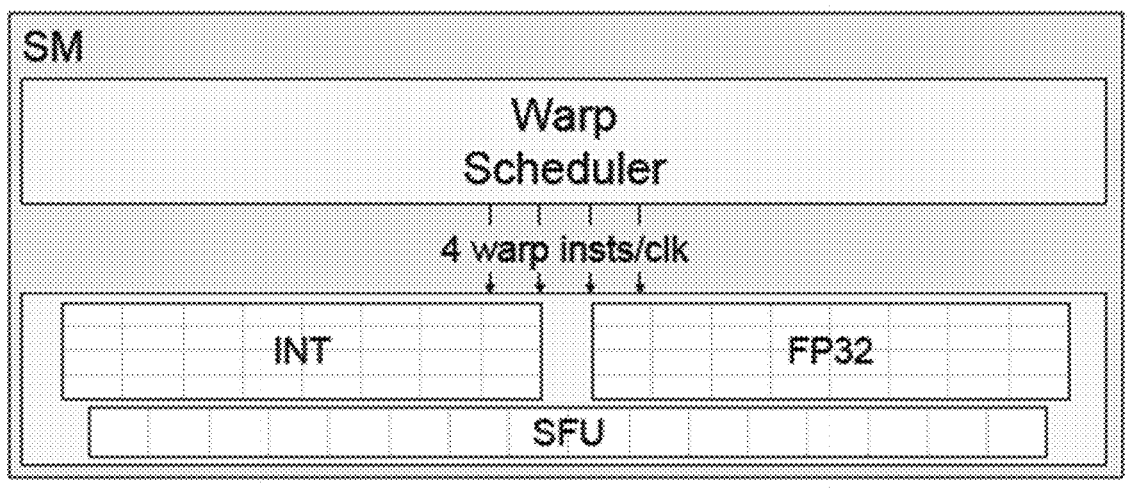
FIG. 8 is a diagram illustrating a difference between a core microarchitecture of the GPU analytical model and the GPU.
Figure 8:
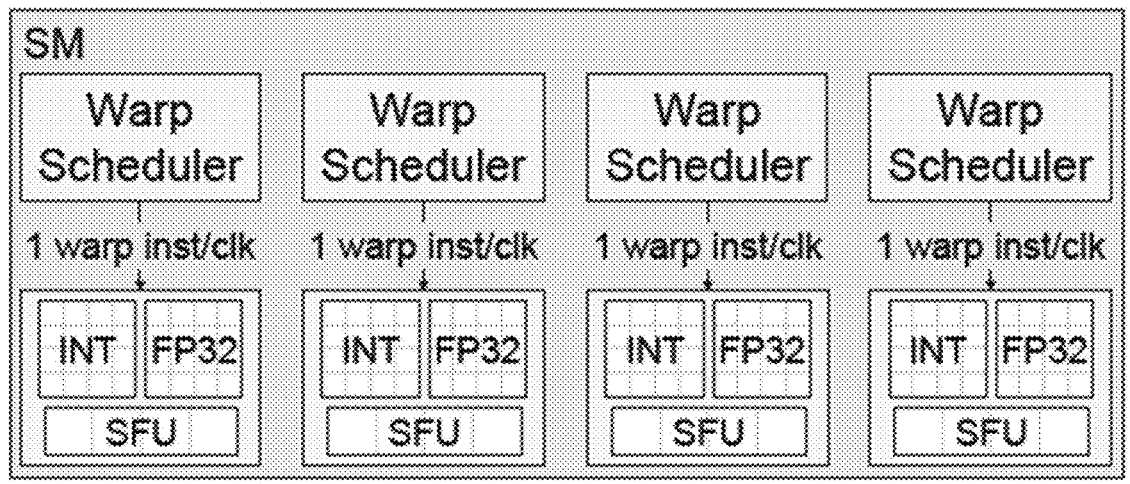
Figure 9:
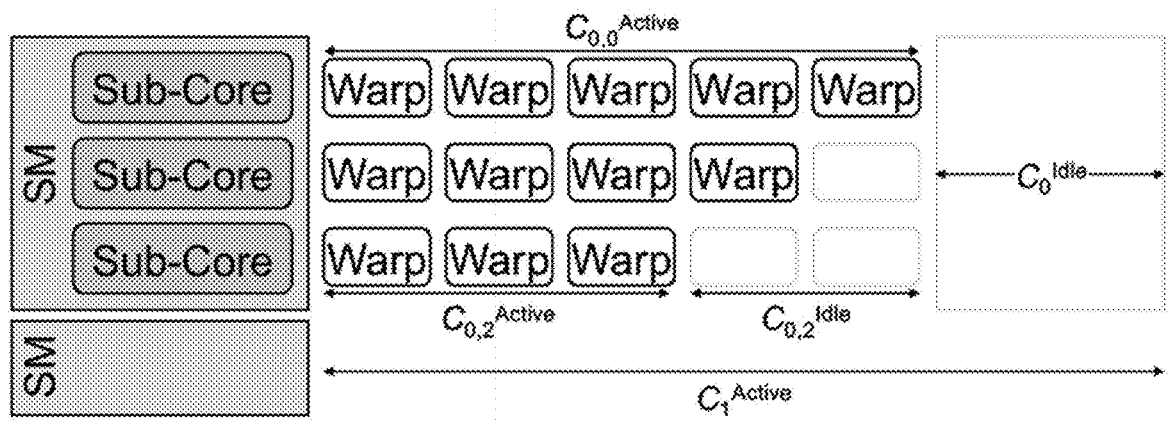
FIG. 9 is a diagram illustrating modeling of load imbalance within and between cores.

FIG. 8 is a diagram illustrating a difference between a core microarchitecture and a GPU in a GPU analytical model, and FIG. 9 is a diagram illustrating load imbalance modeling within and between cores.

Referring to FIG. 8, an existing GPU analytical model can abstract a sub-core as a single multi-issue warp scheduler, as illustrated in (a) of FIG. 8. However, this abstraction can prevent the existing GPU analytical model from capturing a ComStruct stall due to limited per-sub-core functional units and an idle stall caused by load imbalance between sub-cores. Therefore, the GCoM needs to faithfully model the sub-cores and limited functional units as illustrated in (b) of FIG. 8 in order to accurately identify the ComStruct and idle stalls.

In the first step, the GCoM divides a total cycle $C_{i,j}$ of the sub-core into an active cycle and an idle cycle to represent an idle stall caused by load imbalance between sub-cores, which can be expressed as shown in Equation 5 below.

$$C_{i,j} = C_{i,j}^{Active} + C_{i,j}^{Idle} \qquad \text{[Equation 5]}$$

Further, since the idle stall describes the load imbalance between the cores, the GCoM can calculate the idle stall as a difference between an active cycle of one sub-core and an active cycle of a sub-core that is included in the same SM and is being longest executed (see FIG. 9), and Equation 6 below can be obtained.

$$C_{i,j}^{Idle} = \max_k \left( C_{i,k}^{Active} \right) - C_{i,j}^{Active} \qquad \text{[Equation 6]}$$

Then, the GCoM may divide the active cycle of the sub-core into three components including Base, ComData, and MemData, and Equation 7 below can be obtained.

$$C_{i,j}^{Active} = C_{i,j}^{Base} + S_{i,j}^{ComData} + S_{i,j}^{MemData} \qquad \text{[Equation 7]}$$

Here, $C_{i,j}$ is an execution cycle of the j-th sub-core of the i-th SM.

A base component may represent cycles that the sub-core spends to execute the allocated warp instructions without hazard, and the two other components may characterize data hazard for a functional unit output (for example, ComData) and a long-latency memory access (for example, MemData).

Figure 10:
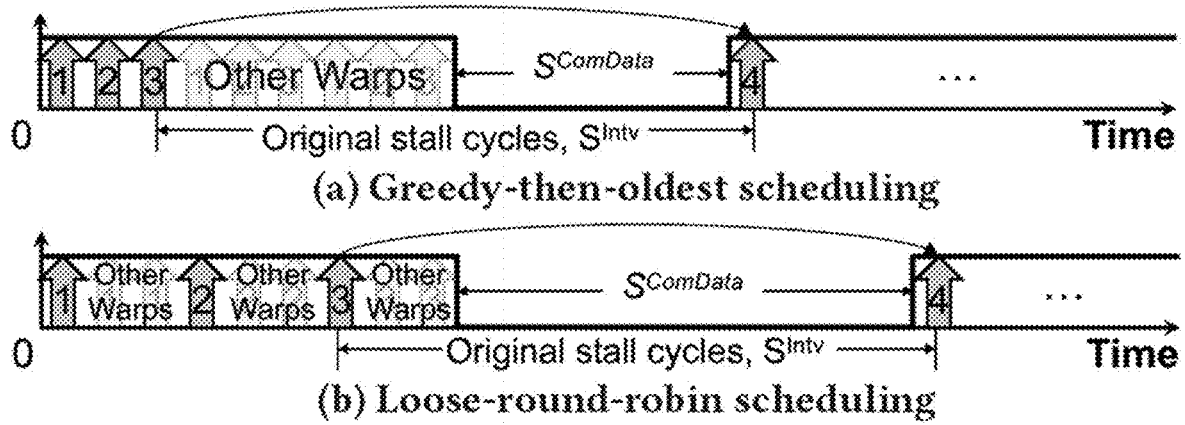
FIG. 10 is a diagram illustrating modeling of a ComData stall regarding a warp scheduling policy of a sub-core warp scheduler.

FIG. 10 is a diagram illustrating modeling of a ComData stall regarding a warp scheduling policy of a sub-core warp scheduler.

Referring to FIG. 10, the execution of the warp may consist of several intervals separated by a destructive stall event. The GCoM can classify the stall cycle as $S_{i,j}^{ComData}$ or $S_{i,j}^{MemData}$ depending on whether the stall is due to a memory operation. That is, the stall cycle is $S_{i,j}^{MemData}$ when there is data dependency for long-latency memory access, and, otherwise, is $S_{i,j}^{ComData}$. Some stall cycles can be hidden by instructions of the other warps that are executed concurrently due to a highly multi-threaded execution model of the GPU. Therefore, the GCoM needs to estimate the number of instructions that the other warps can issue during the stalls for accurate stall cycle calculation.

Further, a scheduling policy of the warp scheduler can have an influence on an execution order of the warps, and thus have a great influence on an amount of hidden stall cycles. The GCoM can model two representative warp scheduling policies: greedy-then-oldest (GTO) and loose-roundrobin (LRR). According to the GTO policy, instructions of the current warp may be executed until a stall event occurs, and then, the oldest warp having ready instructions may be reserved ((a) of FIG. 10). The GCoM can estimate the number of warps and instructions that can be issued during the stall cycle $S_k^{Intv}$, and an amount of non-hidden stall cycle $S_{i,j}^{ComData}$ can be calculated as shown in Equation 8 below.

$$S_{i,j}^{ComData} = \sum_{k \in Intervals} \max(S_k^{Intv} - Cycles_{other}, 0) \quad \text{[Equation 8]}$$

$$Cycles_{other} = \frac{P_{warp} \times (\#Warps_{i,j} - 1) \times AvgIntvInsts}{IssueRate}$$

$$P_{warp} = \min(S_k^{Intv} \times P_{inst}, 1)$$

Here, $S_k^{Intv}$ is a stall cycle of the k-th interval of the representative warp, $Cycles_{other}$ is an execution cycle of concurrent warps, and AvgIntvInsts is the number of average instructions in the interval. $P_{inst}$ and $P_{warp}$ are instruction and warp issuance probabilities, respectively. All necessary statistical values (for example, AvgIntvInsts and $P_{inst}$) can be collected in the interval profiling step. When the stall event is caused by a memory operation, the GCoM can classify the cycle as $S_{i,j}^{MemData}$.

On the other hand, an LRR policy may allow instructions in a ready warp to be issued in a round robin fashion. The policy can issue a single command of one warp and may move to the next ready warp. As illustrated in (b) of FIG. 10, when the warp scheduler uses the LRR policy, only the last instruction of the remaining warps can hide the stall cycle. As a result, the GCoM can estimate the number of instructions using an instruction issue probability $P_{inst}$, and Equation 9 below can be obtained.

$$S_{i,j}^{ComData} = \Sigma_{k \in Intervals} S_k^{Intv} - (L1D\$ \text{ resource contention } \#Warps_{i,j} - 1) \times P_{inst} \quad \text{[Equation 9]}$$

Figure 11:
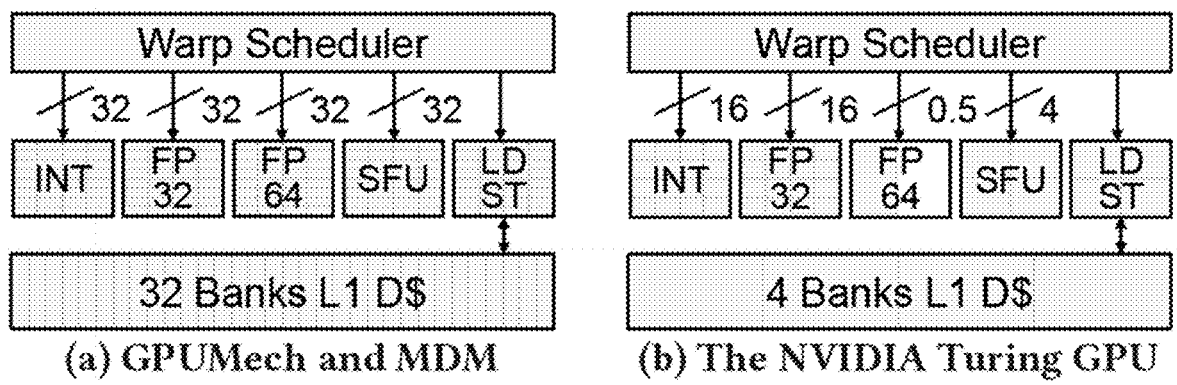
FIG. 11 is a diagram illustrating a difference in number of per-sub-core functional units and per-sub-core L1 D$ banks between a GPU analytical model and a GPU.
Figure 12:
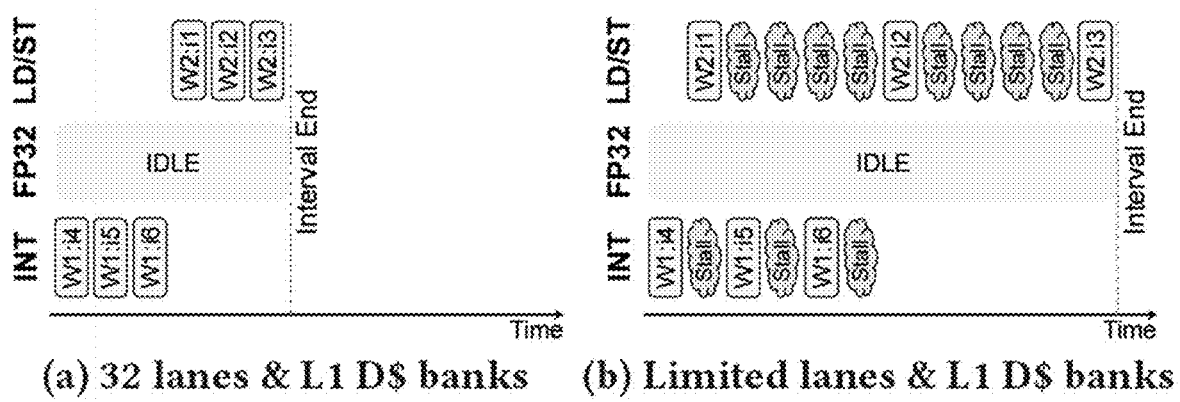
FIG. 12 is a diagram illustrating an influence of limited functional unit lanes of the GPU and L1 D$ banks in intra-SM contention.

FIG. 11 is a diagram illustrating a difference in number of per-sub-core functional units and the per-sub-core L1 D$ banks between the GPU analytical model and the GPU, and FIG. 12 is a diagram illustrating an influence of limited functional unit lanes and L1 D$ banks of the GPU in the intra-SM contention.

Referring to FIGS. 11 and 12, the intra-SM contention model (or first contention model) may quantify an influence of an additional stall cycle caused by L1 D$ resource contention per core. In the case of the existing GPU analytical model, a sufficient number of L1 D$ banks may be assumed so that the sub-core executes load/store instructions in every cycle. However, in the case of the state-of-art GPU, the MemStruct stall may occur in that L1 D$ has a smaller number of banks. The GCoM may divide and define $S_i$ as five components in order to accurately model the MemStruct stall together with the ComStruct stall of the sub core, and $S_i$ may be expressed as Equation 10 below.

$$S_i = S_i^{ComStruct} + S_i^{MemSturct} + S_i^{MSHR} + S_i^{NoC} + S_i^{DRAM} \quad \text{[Equation 10]}$$

In this case, the memory-side contention (that is, $S_i^{MSHR}$, $S_i^{NoC}$, and $S_i^{DRAM}$) can be estimated by an MDM that is a memory contention model of the GCoM. Since the amount of ComStruct stalls is different from the number of warps concurrently executed in a sub-core, the GCoM can express $S_i^{ComStruct}$ as Equation 11 below.

$$S_i^{ComStruct} = S^{Comstruct}(\#CncrWarps) \times \left\lfloor \frac{\#Warps}{\#CncrWarps} \right\rfloor + \quad \text{[Equation 11]}$$

$$S^{Comstruct}(\#Warps_i \bmod \#CncrWarps)$$

Here, #CncrWarps is a maximum number of warps that the SM can simultaneously execute, and #Warps$_i$ is the number of warps of the i-th SM.

The GCoM can model a structural hazard stall during an interval using a difference between cycles in which the warp scheduler issues all instructions in the interval in consideration of or without consideration of limited per-sub-core functional units. Through this, Equation 12 below can be derived.

$$S^{Comstruct}(x) = \Sigma_{k \in Intervals}(C_k^{IssueMax}(x) - C_k^{IssueBase}(x)) \quad \text{[Equation 12]}$$

Here, x is the number of concurrently executing warps of the sub-core, and $C_k^{IssueMax}$ is an issue cycle for the functional unit that takes a longest time in the k-th interval. $C_k^{IssueBase}$ is a base issue cycle that is derived when it is assumed that the functional unit has enough lanes, and these can be calculated according to Equation 13 below.

$$\#ActSubCores(x) = \min(x, \#SubCoresSM) \quad \text{[Equation 13]}$$

$$C_k^{IssueMax}(x) = \max_{m \in FU} \{C_k^{IssueBase}(x), C_{k,m}^{Issue}(x), C_{k,L1}^{Issue}(x)\}$$

$$C_k^{IssueBase}(x) = \frac{I_k \cdot x}{\#ActSubCores(x) \cdot IssueRate}$$

$$C_{k,m}^{Issue}(x) = \frac{I_m \cdot II_m \cdot x}{\#ActSubCores(x) \cdot IssueRate}(I_m \le I_k)$$

$$C_{k,L1}^{Issue}(x) = \left\lceil \frac{b_k}{B_k^{L1}} \right\rceil \times x$$

Here, x is the number of warps simultaneously executed in the sub-core, $I_k$ is the number of warp instructions in the k-th interval of the representative warp, $I_m$ is the number of warp instructions issued to an m-th functional unit, and $II_m$ is a start interval of the functional unit. $C_{k,m}^{Issue}$ is an issue cycle for the m-th unit at the k-th interval. $C_{k,L1}^{Issue}$ is an issue cycle for L1 D$ at the k-th interval.

The GCoM can capture the MemStruct stall caused by limited L1 D$ banks, similar to a method of estimating ComStruct stalls. When L1 D$ causes a larger amount of structural hazard, the GCoM may classify the identified structural stall as MemStruct instead of ComStruct. That is, when $C_{k,L1}^{Issue}(x)$ becomes $C_k^{IssueMax}(x)$, the GCoM can use Equation 14 below instead.

$$S^{MemStruct}(x) = \Sigma_{k \in Intervals}(C_{k,L1}^{Issue}(x) - C_k^{IssueBase}(x)) \quad \text{[Equation 14]}$$

Here, $b_k$ is an amount of L1 D$ access generated by the representative warp, and BP is an effective L1 D$ bandwidth of the k-th interval. The GCoM can collect all necessary pieces of memory-related information, including the L1 D$ access and the bandwidth, in a cache simulation stage.

Figure 13:
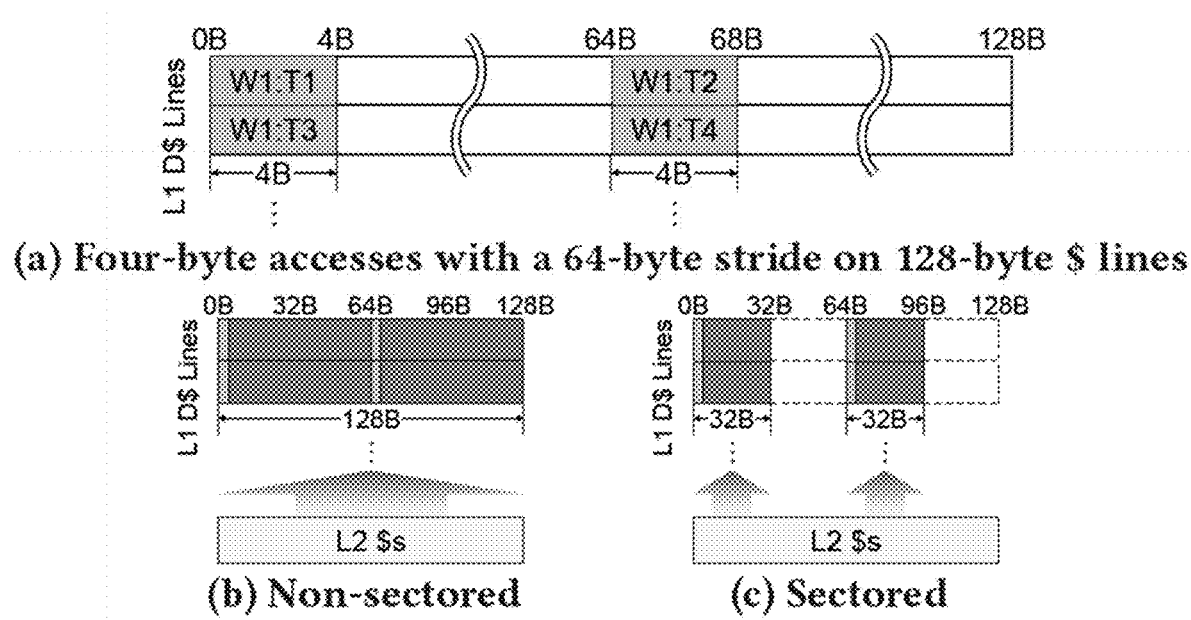
FIG. 13 is a diagram illustrating operations of non-sectored and sectored L1 D$.

FIG. 13 is a diagram illustrating operations of non-sectored L1 D$ and sectored L1 D$.

Referring to FIG. 13, a current state-of-the-art GPU can greatly reduce an amount of memory traffic by using sectored L1 D$. However, existing GPU analytical models may overlook the sectored L1 D$ and overestimate the memory-side contention. In the case of FIG. 13, when four threads of the same warp issue a 4-byte memory request, different operations of a non-sectored cache and a sectored cache can be shown ((a) in FIG. 13). When it is assumed that the cache is cold, the non-sectored cache may use a line size as a memory access unit and fetch data having the line size from L2 $s. However, when the sectored cache is used, a smaller amount of data can be fetched from L2 $s because all necessary pieces of data can be delivered using only two sectors of the cache line ((c) in FIG. 13). As such, because operations of the caches greatly differ, the GCoM needs to accurately model the sectored L1 D$.

The GCoM may accurately model the sectored L1 D$ using the cache simulator. The cache simulator may support both the sectored L1 D$ and the non-sectored L1 D$. When the provided architecture parameters are applied to the sectored L1 D$, the cache simulator may issue a request for a memory having a sector size instead of the line size to L2 D$. After simulation, the cache simulator can deliver per-sector cache statistics (for example, a per-sector hit rate) to the memory contention model.

L1 D$ may be sectored and be capable of streaming. To model a streaming operation of L1 D$, the GCoM can utilize the MDM. The MDM can model a lockup-free characteristic of a streaming L1 D$ by assuming a large number of MSHR entries (for example, 4096). The GCoM can model the lockup-free characteristic by following an approach scheme for the MDM and assuming a sufficient number of MSHR items per L1 D$.

TABLE 1

| Stall | GCoM |
|---|---|
| Base | $C^{Base}$ |
| Compute Data (ComData) | $S^{ComData}$ |
| Compute Structural (ComStruct) | $S^{ComStruct}$ |
| Memory Data (MemData) | $S^{MemData} + S^{NoC} + S^{DRAM}$ |
| Memory Structural (MemStruct) | $S^{MemStruct} + S^{MSHR}$ |
| Control/synchronization (Ctrl) | N/A; negligible |
| Idle | $C_i^{Idle} + C_{i,j}^{Idle}$ |

That is, Table 1 above may indicate that components of the CPI stack are mapped to an analysis representation of the GCoM. The GCoM can neglect a front-end stall event (for example, control hazard) that is known to cause a negligible overhead, similar to the existing models.

Although the above has been described with reference to preferred embodiments of the present disclosure, it will be understood by those skilled in the art that the present disclosure can be variously modified and changed without departing from the spirit and scope of the present disclosure described in the claims below.

[Detailed Description of Main Elements]

100: Performance analysis system
110: User terminal
150: Database
210: Processor
250: User input and output unit
310: Model definition unit
350: Performance analysis unit
130: Performance analysis apparatus
230: Memory
270: Network input and output unit
330: Simulation execution unit
370: Control unit

What is claimed is:

1. A graphics processor performance analysis apparatus based on a graphics processor analytical model comprising:
a model definition unit configured to define a graphics processor core model for identifying structural stalls of computing and a memory, a data stall of the memory, and an idle stall;
a simulation execution unit configured to simulate an operation of a specific graphics processing unit (GPU) by using architecture parameters of a GPU application and the specific GPU as inputs on a basis of the graphics processor core model; and
a performance analysis unit configured to receive an output of the graphics processor core model as a result of the simulation and analyze performance of the specific GPU,
wherein the simulation execution unit is further configured to divide and define a total cycle of a sub-core as a second active cycle and a second idle cycle through a sub-core model of the graphics processor core model, calculate the second idle cycle through a difference between the second active cycles of a specific sub-core and a longest executing sub-core in a same streaming multiprocessor (SM), and divide and define the second active cycle as first to third partial active cycles,
wherein the simulation execution unit is further configured to apply a condition that all instructions require a single cycle and no hazard occurs, to calculate the first partial active cycle on a basis of a number of cycles required for the sub-core, and
wherein the model definition unit, the simulation execution unit, and the performance analysis unit are each implemented via at least one processor.

2. The graphics processor performance analysis apparatus based on a graphics processor analytical model according to claim 1, wherein the graphics processor core model includes
a trace collection module configured to collect instruction traces of the GPU application during the simulation;
a warp selection module configured to select a representative warp from among a plurality of warps on the basis of a per-warp profile;
a cache simulation module configured to perform a cache simulation using the architecture parameters and load/store instructions collected by the trace collection module;
an interval profiler configured to divide an execution of the representative warp into a plurality of intervals using an output of the cache simulation;
a sub-core model configured to estimate a per-sub-core execution cycle using the plurality of intervals;
a first contention model configured to estimate a per-streaming multiprocessor (SM) execution cycle and an intra-SM contention cycle using an output of the sub-core model;
a second contention model configured to estimate a memory contention cycle using an output of the first contention model; and
a load balance model configured to capture an idle cycle caused by a load imbalance between SMs using an output of the second contention model,
wherein the trace collection module, the warp selection module, and the cache simulation module, are each implemented via at least one processor.

3. The graphics processor performance analysis apparatus based on a graphics processor analytical model according to claim 2, wherein the trace collection module is further configured to collect dynamic command traces of the GPU application from an actual GPU or collect related instructions from a functional simulator.

4. The graphics processor performance analysis apparatus based on a graphics processor analytical model according to claim 2, wherein the warp selection module is further configured to determine the representative warp by performing k-means clustering on the per-warp profile.

5. The graphics processor performance analysis apparatus based on a graphics processor analytical model according to claim 1, wherein the simulation execution unit is further configured to estimate a total cycle of a kernel by averaging execution cycles of respective streaming multiprocessors (SMs) of the specific GPU through the graphics processor core model.

6. The graphics processor performance analysis apparatus based on a graphics processor analytical model according to claim 5, wherein the simulation execution unit is further configured to divide and define the execution cycle of the SM as a first active cycle and a first idle cycle.

7. The graphics processor performance analysis apparatus based on a graphics processor analytical model according to claim 1, wherein the simulation execution unit is further configured to model the second and third partial active cycles according to a scheduling policy of a warp scheduler including Greedy-Then-Oldest (GTO) and Loose Round Robin (LRR).

8. The graphics processor performance analysis apparatus based on a graphics processor analytical model according to claim 1, wherein the simulation execution unit is further configured to calculate execution cycles of sub-cores through a first contention model of the graphics processor core model, average the execution cycles into a per-sub-core cycle, and sum stall cycles to calculate a first active cycle of the SM.

9. The graphics processor performance analysis apparatus based on a graphics processor analytical model according to claim 8, wherein the simulation execution unit is further configured to divide and define the stall cycle as first and second partial stall cycles regarding the structural stalls of the computing and the memory, and third to fifth partial stall cycles according to memory contention.

10. The graphics processor performance analysis apparatus based on a graphics processor analytical model according to claim 9, wherein the simulation execution unit is further configured to model the first partial stall cycle using Equation M1 below:

$$S^{ComStruct}(x) = \Sigma_{k \in Intervals}(C_k^{IssueMax}(x) - C_k^{IssueBase}(x)) \quad \text{[Equation M1]}$$

where $S^{ComStruct}$ is the first partial stall cycle, x is a number of concurrent execution warps of the sub-core, $C_k^{IssueMax}$ is an issue cycle of a functional unit that takes a longest time in a k-th interval, and $C_k^{IssueBase}$ is a base issue cycle.

11. The graphics processor performance analysis apparatus based on a graphics processor analytical model according to claim 9, wherein the simulation execution unit is further configured to model the second partial stall cycle using Equation M2 below:

$$S^{MemStruct}(x) = \Sigma_{k \in Intervals}(C_{k,L1}^{Issue}(x) - C_k^{IssueBase}(x)) \quad \text{[Equation M2]}$$

where $S^{MemStruct}$ is the second partial stall cycle, and $C_{k,L1}^{issue}$ is an issue cycle for L1 D\$ (data cache) at a k-th interval.

12. The graphics processor performance analysis apparatus based on a graphics processor analytical model according to claim 9, wherein the simulation execution unit is further configured to estimate the third to fifth partial stall cycles through a second contention model of the graphics processor core model.

13. A graphics processor performance analysis method performed by a graphics processor performance analysis apparatus, the graphics processor performance analysis method comprising:
defining a graphics processor core model for identifying structural stalls of computing and a memory, a data stall of the memory, and an idle stall;
simulating an operation of a specific graphics processing unit (GPU) by using architecture parameters of a GPU application and the specific GPU as inputs on a basis of the graphics processor core model;
receiving an output of the graphics processor core model as a result of the simulation and analyze performance of the specific GPU;
defining a total cycle of a sub-core as a second active cycle and a second idle cycle through a sub-core model of the graphics processor core model, calculating the second idle cycle through a difference between the second active cycles of a specific sub-core and a longest executing sub-core in a same streaming multi-processor (SM), and dividing and defining the second active cycle as first to third partial active cycles; and
applying a condition that all instructions require a single cycle and no hazard occurs, to calculate the first partial active cycle on a basis of a number of cycles required for the sub-core.

* * * * *